United States Patent [19]
Brown et al.

[11] Patent Number: 5,739,908
[45] Date of Patent: Apr. 14, 1998

[54] LIQUID CRYSTAL OPTICAL FREQUENCY SHIFTER

[75] Inventors: Tyler Alan Brown, Schaumburg, Ill.; Robert Theodore Weverka, Boulder, Colo.; Mark Olmsted Freeman, Hsinchu, Taiwan

[73] Assignee: The Regents of the University of Colorado, Boulder, Colo.

[21] Appl. No.: 431,773

[22] Filed: May 1, 1995

[51] Int. Cl.$^6$ ........................................ G02F 1/05
[52] U.S. Cl. .............................. 356/367; 359/278
[58] Field of Search .............. 356/367; 359/326, 359/278, 279

[56] References Cited

U.S. PATENT DOCUMENTS

| | | | |
|---|---|---|---|
| 4,197,008 | 4/1980 | Pinnow et al. | 359/278 |
| 5,132,826 | 7/1992 | Johnson et al. | |
| 5,168,381 | 12/1992 | Walba | |
| 5,231,521 | 7/1993 | Johnson et al. | |
| 5,243,455 | 9/1993 | Jonson et al. | |
| 5,528,393 | 6/1996 | Sharp et al. | 359/53 |
| 5,552,912 | 9/1996 | Sharp et al. | 359/73 |

OTHER PUBLICATIONS

Article "Quantized Complex Ferroelectric Liquid Crystal Spatial Light Modulators" by M. O. Freeman et al, Applied Optics, vol. 31, No. 20, Jul. 1992, pp. 3917–3929.

*Primary Examiner*—Richard A. Rosenberger
*Attorney, Agent, or Firm*—E. C. Hancock; F. A. Sirr; Holland & Hart llp

[57] ABSTRACT

An optical frequency shifter is provided to change the frequency of a coherent input light beam by imparting periodic increases in phase to the beam. This increase in phase is caused by ferroelectric liquid crystals (FLCs) in conjunction with quarter wave plates. The FLCs are repeatedly switched on and off by electrical signal generators, adding phase shift in steps, which in turn results in a higher output optical frequency.

31 Claims, 5 Drawing Sheets

LIQUID CRYSTAL OPTICAL FREQUENCY SHIFTER

BACKGROUND OF THE INVENTION

1. Field of the Invention

This invention relates to apparatus and methods for changing the frequency of a coherent input optical beam. More specifically, this invention utilizes ferroelectric liquid crystals to repeatedly and incrementally change the phase of the optical beam, thus resulting in a change in the overall frequency of the beam.

2. Description of Related Art

The ability to shift the frequency of an optical beam is very useful in condition measuring systems. In an exemplary measurement system, a portion of an original optical beam is directed to a region where some variable quantity or condition to be measured operates to shift the optical phase of this portion of the beam. A second portion of the original beam is frequency shifted by means such as the present invention, and the two beam portions are then beat back together. A resulting beat signal is of a frequency that is the difference between the frequencies of the two beam portions. The phase of the resulting signal varies as the measured quantity or condition varies.

Means for changing optical frequency are known in the art. For example, a device using a physically rotating wave plate causes repeated incremental changes in beam phase, resulting in an overall beam frequency change. This system is subject to mechanical vibrations, resulting in inaccuracies. Another device used to change optical frequency is an acoustooptic device. As an optical beam passes through this device, acoustic waves deflect the beam slightly, and also increase its frequency by the frequency of the acoustic wave. There are losses associated with this device in that not all of the input optical beam is deflected. More importantly, the exit angle of the output frequency shifted light varies with the acoustic frequency. Thus, careful position adjustments must be made in the device when a different frequency change is desired. This varying exit angle also makes it difficult to utilize fiber optic pickup of the frequency shifted output beam.

It is known in the art to use ferroelectric liquid crystals (FLCs) to change the phase of a light beam. "Quantized Complex Ferroelectric Liquid Crystal Spatial Light Modulators" by M. Freeman et al, *App. Optics*, Vol. 31, No. 20, pp. 391–397, Jul. 10, 1992 discloses a four-step FLC modulator which changes the phase of a light beam by 90 degrees, 180 degrees, and 270 degrees as the light passes through space. No suggestion of repeatedly stepping through these phase changes to produce a frequency change appears.

U.S. Pat. Nos. 5,132,826, 5,231,521, and 5,243,455 all by Johnson et al, disclose optical polarization interference filters utilizing FLC cells as electrically rotatable retarders. The filters are thus tunable, continuously if desired. Such filters merely select from available frequencies rather than changing frequency.

Related patents include U.S. Pat. No. 4,815,035 by Brooks which discloses a scrolling liquid crystal spatial light modulator wherein optical signals are scrolled across an array of liquid crystals. U.S. Pat. No. 5,168,381 discloses chiral smectic liquid crystal devices employing two or more liquid crystal cells to obtain fast-switching, high-contrast light valves and multistable gray scale light valves. These patents involve dynamic processing, but no frequency shifting occurs.

A need remains in the art for a optical frequency shifter that does not involve physical movement or adjustment as the frequency of a beam dynamically changes.

SUMMARY OF THE INVENTION

The present invention provides an optical frequency shifter that operates to change the frequency of a coherent input light beam by imparting periodic increases in phase to the input beam as the beam traverses the frequency shifter. This periodic increase in phase shift is caused by ferroelectric liquid crystals (FLCs) whose thickness is chosen such that there is a one-half wave plate paired with quarter wave plates. The FLCs are repeatedly switched between two states by electrical signal generators, thus adding phase shift in steps, which in turn results in a higher output optical frequency.

More specifically, but without limitation thereto, a laser feeds a coherent input beam into the frequency shifter of the present invention. The frequency shifter includes an entrance polarizer and an exit polarizer. Intermediate between the two polarizers are arranged cascaded pairs of quarter wave plates and FLCs. Each FLC is controlled by a signal generator, ideally having a 50% duty cycle square wave output. From beam input to beam output, the frequency of the signal generators controlling the signal generator output to the wave plate/FLC pairs increases by a factor of two, that is, the first wave plate/FLC pair receives a signal generator frequency that can be defined as f, the second wave plate/FLC pair receives a signal generator frequency 2f, and the nth wave plate/FLC pair receives a signal generator frequency nf. The beam output from the frequency shifter comprises a coherent beam of light having a higher frequency than the beam of light originally emitted by the laser.

As a feature of the invention, the frequency shifter is used as a component of a condition measuring system.

As an additional feature of the invention, the above-described signal generators provide an output waveshape that produces a "chirp" output beam; i.e., a brief linear increase in the input optical beam's frequency. In this arrangement, the above-described signal generators provide square wave outputs having an increase in frequency, instead of producing square wave outputs of constant frequency as above described. Ideally, this frequency increase is generally linear as a function of time.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
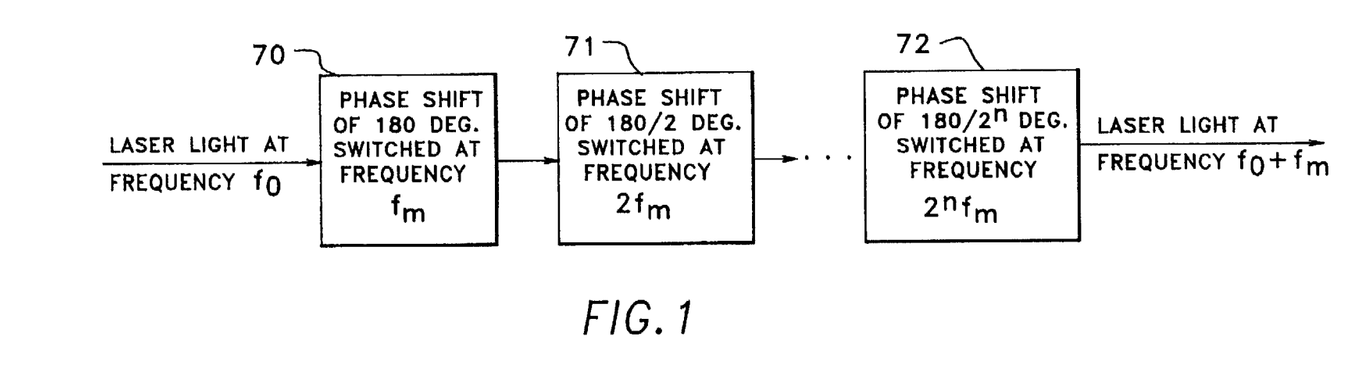
FIG. 1 is a functional block diagram showing an embodiment of the present invention having a series of n phase shifting units.

FIG. 1 is a functional block diagram showing the operation of the present invention. The present invention can be understood as a serial assembly of phase shifting units 70–72 that are switched at different rates. Each unit has two switched states. When a unit is switched into the first state, a larger phase shift is added to a beam of coherent light passing through the unit than when the unit is in its second state. At least two phase shifting units, the 180 degree unit 70 and the 90 degree unit 71, are required. Each phase shifting unit is switched at a different rate. Unit 70 imparts a phase shift differential of 180 degrees and switches at frequency $f_m$. Unit 71 imparts a phase shift differential of 90 degrees and switches at frequency $2f_m$. Each additional unit imparts a frequency differential of half as much as the previous unit and switches at twice the rate. The final, nth, unit 72 adds $180/2n$ phase shift differential and switches at a frequency of $2^n f_m$.

Figure 2:
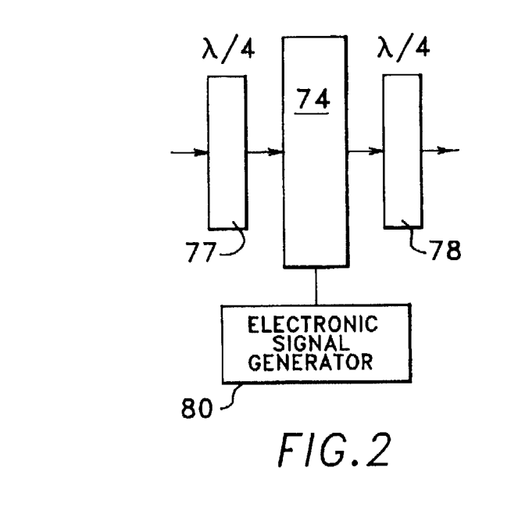
FIG. 2 shows an implementation of a single phase shift unit of FIG. 1.

FIG. 2 shows how each unit 70–72 is implemented. Generally, each phase shift unit is implemented with an FLC cell 74 between two quarter wave plates 77 and 78. The amount of phase shift differential imparted to the beam when the unit is switched between its two switched states is determined by the material chosen for the FLC 74. An FLC whose optical axes rotate by theta between its two switched states produces a phase shift differential of two times theta. Electronic signal generator 80 switches FLC 74 between its two states at a rate of, for example, $2f_m$ for phase shift unit 71 of FIG. 1.

Figure 3:
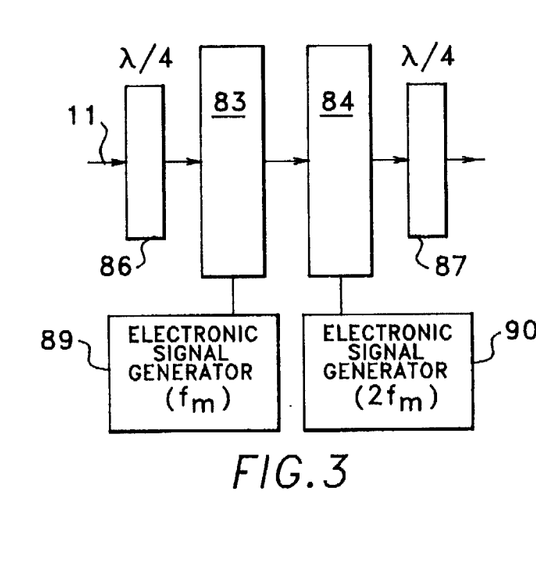
FIG. 3 shows a two stage embodiment of the present invention.

FIG. 3 shows a cascade of two FLC phase shifters. In a cascade of phase shifters, the quarter wave plates between the adjacent FLCs can be omitted. The preferred embodiment of FIG. 3 includes two FLCs 83 and 84, two quarter wave plates 86 and 87, and two signal generators 89 and 90. Linearly polarized light beam 11 enters quarter wave plate 86 and becomes circularly polarized. FLC 83 adds a phase shift to the beam. The amount of phase shift added by FLC 83 in its first switched state is 180 degrees more than the amount of phase added in the second switched state. Signal generator 89 switches FLC 83 between its two switched states at a rate of $f_m$. FLC 84 has a phase differential of 90 degrees between its two switched states and is switched at a rate of $2f_m$ by signal generator 90. The phase shifted beam then passes through a second quarter wave plate 87, which changes the circularly polarized light back into linearly polarized light. The embodiment of FIG. 3 is lossless; i.e., no light power is lost.

Figure 4:
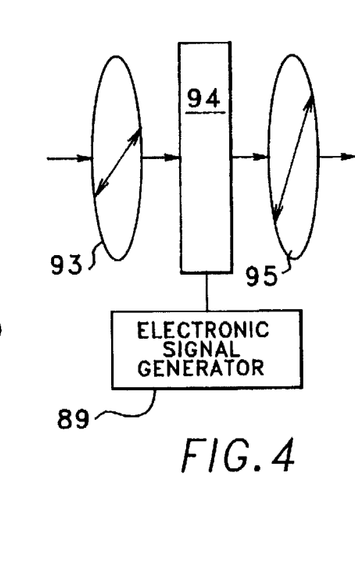
FIG. 4 is an alternative implementation of the 180 degree phase shifting unit of FIG. 3.

FIG. 4 shows how the 180 degree FLC 83 of FIG. 3 may be implemented by any FLC regardless of the rotation angle between its states. The circularly polarized light from quarter wave plate 86 passes through a polarizer 93 into an FLC 94 switched by signal generator 89, and then through polarizer 95. Some light loss occurs in this implementation, but any convenient FLC material may be used for FLC 94.

Figure 5:
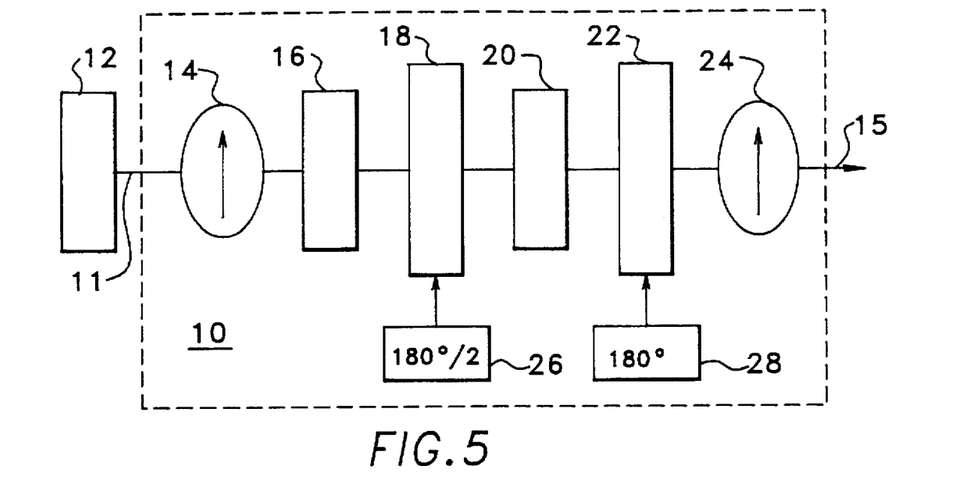
FIG. 5 shows another embodiment of the invention having two FLCs, wherein the frequency shifter is fed by an input optical laser beam.

FIG. 5 shows a laser 12 feeding a coherent input light beam or wave front 11 into a four step frequency shifter 10 in accordance with the present invention. Frequency shifter 10 makes use of two polarizers 14 and 24, two quarter wave plates 16 and 20, two FLCs 18 and 22, and two conventional signal generators 26 and 28. Light beam 11 from laser 12 is polarized by polarizer 14. Quarter wave plate 16 then circularly polarizes the beam and feeds it to FLC 18. Quarter wave plates 16 and 20, FLC 18, and signal generator 26 comprise the 90 degree phase shift unit 71 of FIG. 1. FLC 22, polarizer 24, and signal generator 28 comprise the 180 degree phase shift unit 70 of FIG. 1. In accordance with the invention, additional wave plate/FLC/waveplate triplets or sandwiches similar to triplet 16/18/20 may be provided. The output 15 of frequency shifter 10 is a coherent beam of light 15 having a higher frequency than the beam of light 11 originally emitted by laser 12. Frequency shifter 10 can operate in free space or can feed its beam output 15 into fiber optics (not shown).

Figure 6:
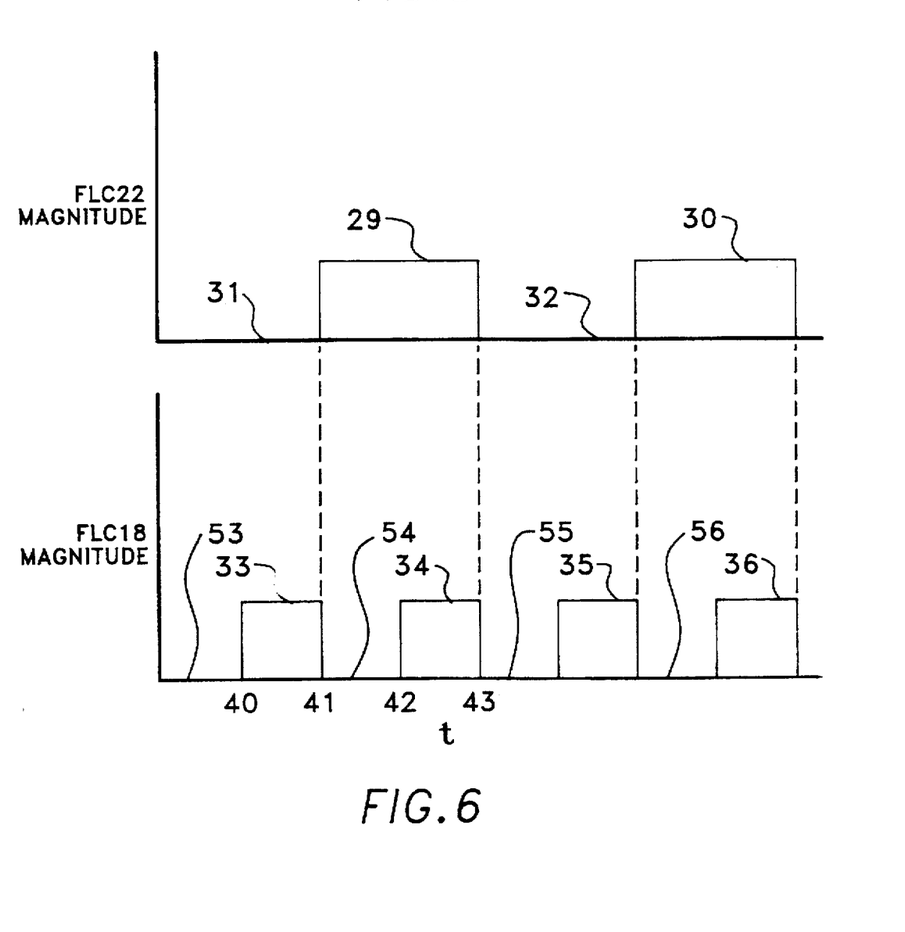
FIG. 6 is a diagram showing the FLC input or control electrical signals that are used to switch the two FLCs of FIG. 5.

FLC 18 is switched by electrical signal generator 26 whose output is shown at 53, 33, 54, 34, 55, 35, 56, 36 in FIG. 6. When the signal from signal generator 26 is high, as at 33, 34, 35, and 36, FLC 18 advances the phase of its incoming light beam by 90 degrees over the phase that occurs when the signal from signal generator 28 is low, as at 53, 54, 55 and 56.

Quarter wave plate 20 changes the circularly polarized light back into linearly polarized light. The light beam output from quarter wave plate 20 then enters FLC 22.

FLC 22 is switched by electrical signal generator 28 which optimally produces a 50% duty cycle square wave electrical signal like that shown at 31, 29, 32, 30 in FIG. 6. When the signal from signal generator 26 is high, as at 29 an 30, FLC 22 adds 180 degrees of phase shift to the linearly polarized light, i.e. adds 180 degrees to the phase shift that occurs when the signal is low, as at 31 and 32.

FLCs 18 and 22 are preferably high speed binary FLCs, as described in "High Speed Binary Optically Addressed Spatial Light Modulator" by G. Moddell et al. *App. Phys. Lett.* 55, pp 537–539, 1989, incorporated herein by reference. Other types of FLCs may also be used, including smectic A and electroclinic F.

FLCs, such as 18 and 22, can be modelled as a birefringent material having different indices of refraction along the ordinary and extraordinary axes. When FLCs 18 and 22 receive a high input from signal generators 26, 28, the orientation of the optical axes for the indices of refraction rotate, which in the setup shown causes the phase of the output light from the FLC to advance. FLC 18 must rotate its optical axes by approximately 45 degrees between its two states.

In FIG. 6, the electrical signals from signal generator 28 (top) and signal generator 26 (bottom) are shown. It can be seen from this figure that the signal to FLC 18 goes high first at 33, producing a 90 degree phase shift in its optical beam at time 40. As the signal to FLC 18 goes low at time 41, the signal to FLC 22 goes high at 29, producing an aggregate light beam phase shift of 180 degrees at time 41. While the signal to FLC 22 remains high at 29, the signal to FLC 18 goes high as well at 34, adding an additional 90 degrees of phase shift to the beam. Thus, the aggregate phase shift at time 42 is 270 degrees. Finally, at time 43, both signals go low at 32 and 55. Neither FLC now modifies the phase of the original light beam 11. Since a zero degree phase shift differential is indistinguishable from a 360 degree phase shift differential, the optical beam 11 has now stepped through phase shifts of 90 degrees, 180 degrees, 270 degrees, and 360 degrees in turn. Polarizer 24 extracts the 180 degree phase shifted portion of the output beam, thereby producing output beam 15.

Optimally, the above-described steps of adding phase shift occur at evenly spaced time intervals as shown in FIG. 6 to minimize artifacts and harmonics in output beam 15. Thus, both electrical signals from electrical generators 26 and 28 to the two FLCs 18 and 22 have 50% duty cycles and one, i.e. 26, has twice the frequency of the other.

FLC switching frequencies of 10 microseconds are easily obtainable in the art, so that a gain of 360 degrees (or one cycle) could occur every 40 microseconds. By repeating each of the phase adding steps as described, the frequency of output beam 15 is effectively raised about 25 kilohertz. It is possible to make the phase shift addition smoother by breaking the incremental phase shift addition down into smaller steps. The addition of each extra set of one FLC and two quarter wave plates results in twice as many steps in the process of adding 360 degrees phase shift to input beam 11. Thus, three FLC and quarter wave plate sets result in an addition of 45 degrees at each step (rather than 90 degrees as above described) and a total addition of 360 degrees would now take eight steps (rather than four as above described).

Figures 7, 8:
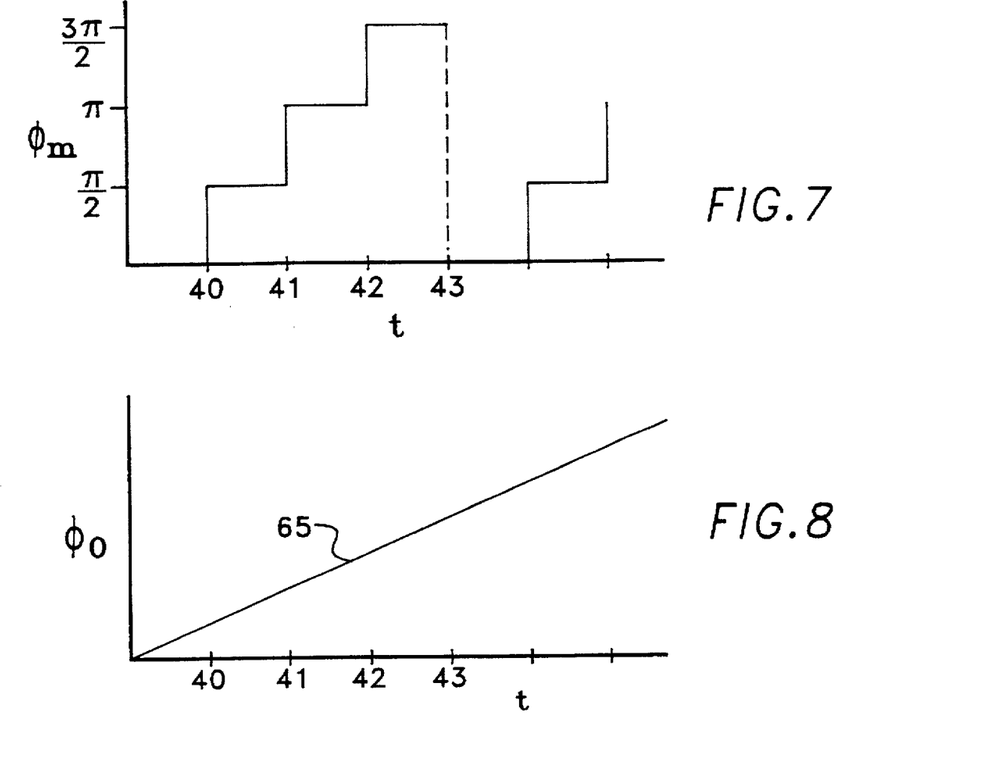
FIG. 7 is a diagram showing the phase shift that is added to the input laser beam of FIG. 5 by operation of the present invention, wherein phase shift is plotted as a function of time.
FIG. 8 plots the change in phase as a function of time of the input optical beam of FIG. 5.
Figure 9:
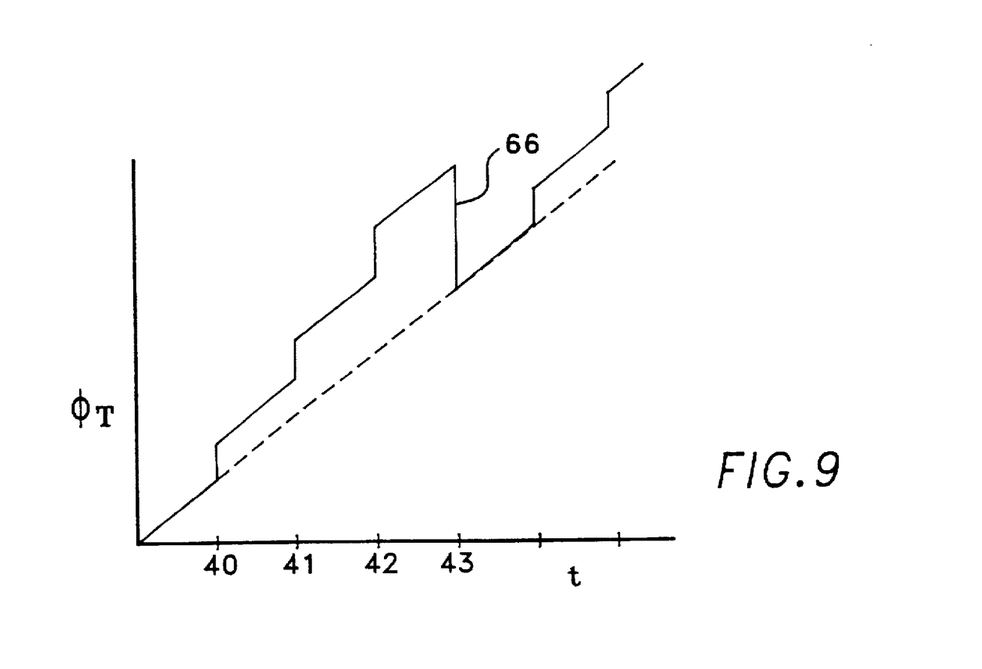
FIG. 9 plots the aggregate change in phase with time of the output optical beam of FIG. 5.

FIGS. 7 through 9 show the effect on the optical frequency of input beam 11 that is produced by frequency shifter 10 of FIG. 5. FIG. 7 shows the amount of phase shift that is added by frequency shifter 10 as a function of time. As discussed in conjunction with FIG. 6, frequency shifter 10 adds 90 degrees of phase shift at time 40, 180 degrees at time 41, 270 degrees at time 42 and zero degrees (or equivalently 360 degrees) at time 43. FIG. 8 plots the change in phase of input beam 11 from laser 12 as a function of time. In general, frequency equals the slope (or derivative) of curve 65, where phase is in cycles and time is in seconds.

FIG. 9 shows the change in phase of optical output beam 15 from frequency shifter 10 of FIG. 5 plotted as a function of time. The above-described phase shifts are added to input beam 11 to produce a slightly choppy phase shift curve 66 having a steeper slope than curve 65 of FIG. 8, corresponding to a higher frequency than input beam 11. FIGS. 7 through 9 are not to scale. A typical system in accordance with the invention adds about 25 kilohertz to an input beam 11 that is in the terahertz range.

Figure 10:
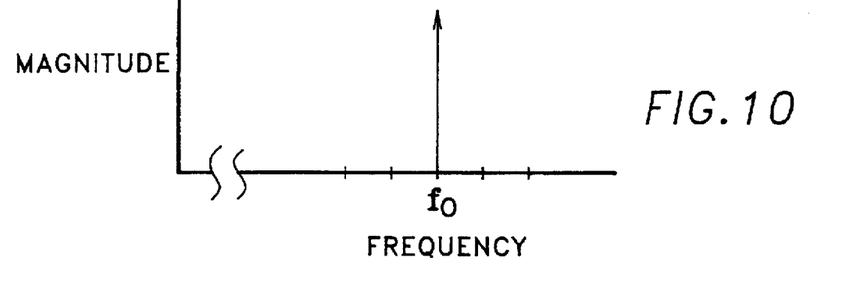
FIG. 10 shows the spectrum of the input optical beam of FIG. 5.
Figure 11:
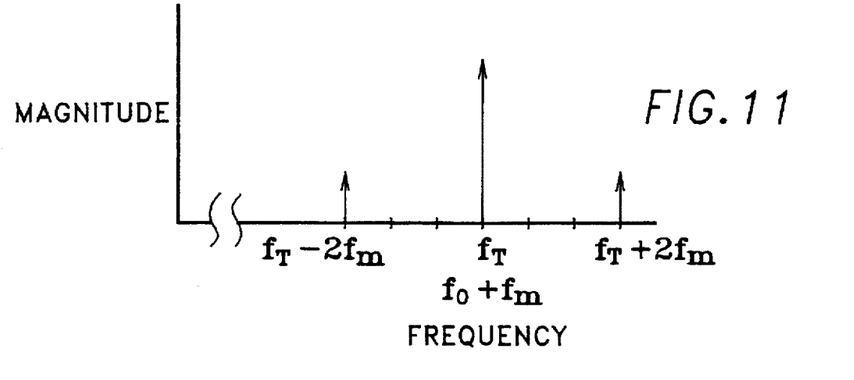
FIG. 11 shows the spectrum of the output optical beam of FIG. 5, as is produced by operation of the present invention.

FIGS. 10 and 11 show the effect of frequency shifter 10 of FIG. 5 plotted in the frequency domain. FIG. 10 shows input beam 11 from laser 12 at single frequency $f_o$. Since input beam 11 is coherent, there is negligible frequency spread. FIG. 11 shows the frequency spectrum of output optical beam 15 from frequency shifter 10. Most of the output energy is contained in the frequency $f_T$, which is $f_0$ shifted by an amount $f_m$. In a four-step frequency shifter like 10, small magnitude harmonics appear at frequencies $f_T-2f_m$ and at $Ft+2f_m$. This is caused by the discontinuities in frequency that are caused by stepping through phase shifts. If more phase change steps are used (by adding more FLC and quarter wave plate stages), or if smoothly rotating FLCs such as electroclinic or smectic A FLCs are used, the harmonics of FIG. 11 are of smaller magnitude and are wider spread in the frequency domain. If the phase shift steps are not perfectly evenly spaced, other harmonics will likely appear. Almost all of the output energy is, however, retained in the frequency $f_T$.

Figure 12:
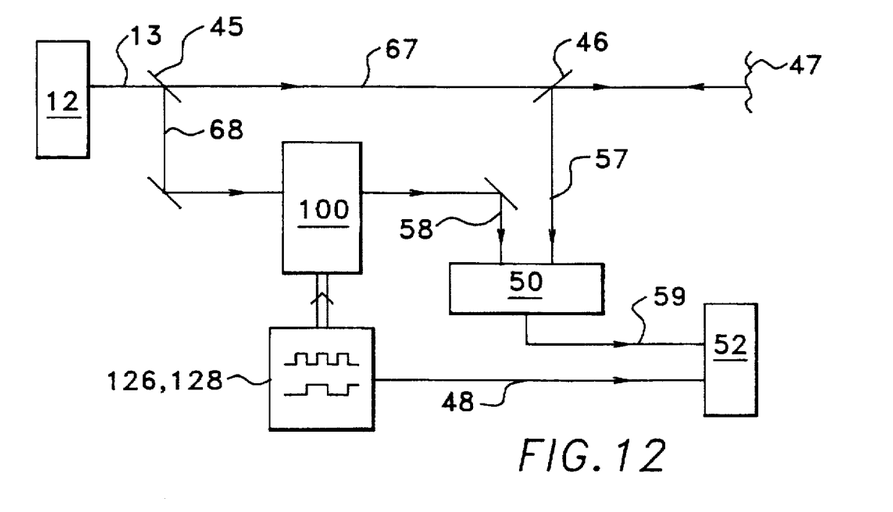
FIG. 12 shows the present invention incorporated into a measurement system.

FIG. 12 shows a phase shifter 100 of the present invention incorporated into a measuring system. Laser 12 produces a coherent beam 13. Beam 13 passes through beam splitter 45. A first portion 67 of beam 13 continues through beam splitter 46 to measure some quantity 47 that operates to change the phase of beam portion 67. This portion 67 of the beam is reflected back from quantity 47 and passes back from beam splitter 46, causing a beam 57 to be presented to a first input of beat device 50.

A second portion 68 of laser beam 13 is reflected by beam splitter 45 and passes through frequency shifter 100 of the present invention. Output beam 58 from frequency shifter 100 is provided to a second input of beat device 50, usually a photodetector.

For clarity, signal generators 126 and 128 are shown apart from frequency shifter 100 in FIG. 12. An output signal 48 of frequency $f_m$ is provided by one of the signal generators 126, 128, and provides a reference frequency to lock in amplifier 52. Beat device 50 beats together frequency shifted beam 58 and measurement beam 57, and outputs an electrical signal 59 whose frequency is the difference between the frequencies of beams 58 and 57. Lock in amplifier 52 operates in a well-known manner to compare the two beams 48 and 59 and detect their relative phase.

For example, if the system of FIG. 12 is designed to measure the surface smoothness of a surface 47, the phase of measurement beam 57 changes as the distance from laser 12 to surface 47 changes. The relative phase that is detected by lock in amplifier 52 also changes. Thus, the relative phase determined by lock in amplifier 52 is directly related to the smoothness of surface 47. The above described frequency shifting and beating is necessary because it is impractical to determine the relative phase of optical beam 57 directly, due to its extremely high frequency. The system of FIG. 12 allows comparison of signals in the kilohertz range.

Figure 13:
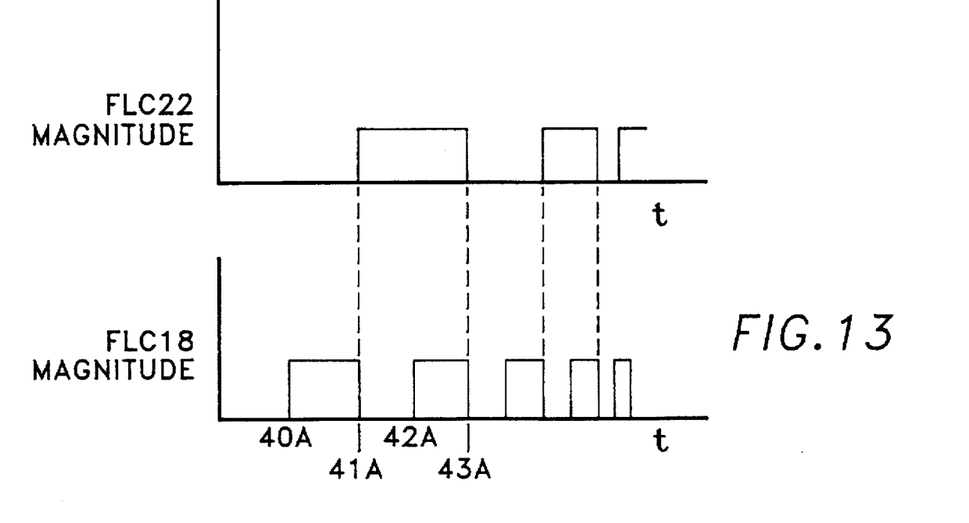
FIG. 13 is a diagram of the two FLC input electrical signals that are used to switch the two FLCs of FIG. 5 in order to obtain a chirp output beam.
Figure 14:
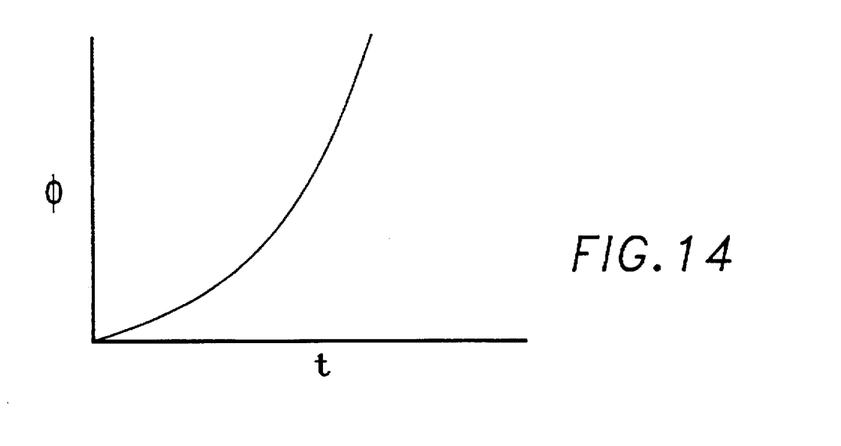
FIG. 14 is a diagram showing the phase change in the input optical beam that is imparted by the FIG. 13 embodiment of the invention.
Figure 15:
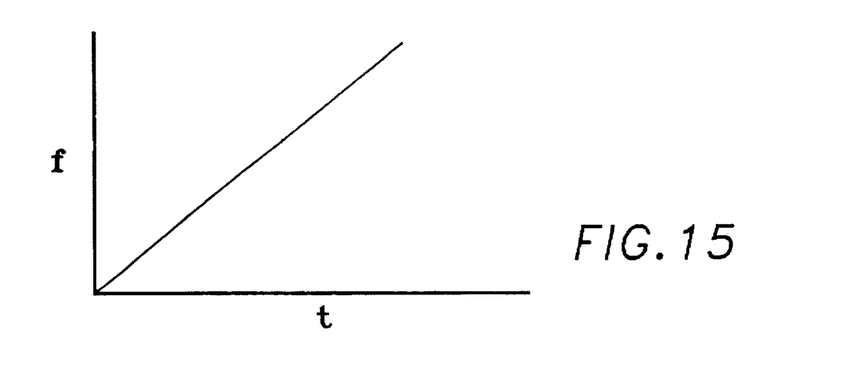
FIG. 15 shows the frequency of the output optical beam plotted as a function of time for the embodiment of FIG. 13.

FIGS. 13 through 15 show another application of a frequency shifter in accordance with the invention. This application produces a "chirp" output beam, or a brief linear increase in the input optical beam's frequency. The chirp modulation is a well known, spectrally diverse, means of performing measurements as in FIG. 12, and it has the added advantage of removing 360 degree phase ambiguities. Frequency shifter used in FIGS. 13 through 15 has the same general configuration as that shown in FIG. 5. However, in FIG. 13, signal generators 26 and 28, instead of producing square waves of constant frequency, now produce electrical signals wherein the frequency of the output square waves increases with time, this frequency increase being generally linear with time, as shown in FIG. 13. As above, the signals of FIG. 13 have a 50% duty cycle, and the signal controlling FLC 22 has half the frequency of the signal controlling FLC 18.

The total phase change is produced by FIG. 13 is shown in FIG. 14, wherein phase change discontinuities are not shown. The phase increases quadratically, as frequency is the derivative of phase. Of course, the phase can increase quadratically only for a short period of time, consistent with the limitations in the switching speeds of FLCs 18 and 22 of FIG. 5. Thereafter, typically, the frequency returns to $f_o$ and the chirp process repeats. As shown in FIG. 15, the frequency increase produced by FIG. 13 is linear with time, while phase increases quadratically.

It will be appreciated by those skilled in the art that frequency shifters in accordance with the invention can impart a variety of frequency variations to a coherent optical input beam by varying the electrical waveshape from signal generators that are used to switch the FLCs. The above-described constant frequency increase and linear frequency increase embodiments of the invention are only two possibilities.

While exemplary preferred embodiments of the present invention are described herein with particularity, those having normal skill in the art will recognize various changes, modifications, additions and applications other than those specifically mentioned herein without departing from the spirit of this invention.

What is claimed is:

1. A method providing a frequency shift to an input coherent light beam, comprising the steps of;
   providing an input coherent light beam of a relatively constant frequency,
   presenting said input beam to a cascade arrangement of n phase shift units numbered 1 through n, each phase shift unit comprising a serial configuration of a quarter wave plate and a ferroelectric liquid crystal (FLC),
   providing n electrical signal generators whose alternating current output frequencies bear the frequency relationship $f$, $2f$,—$2^n f$,
   connecting said n electrical signal generators to the FLCs of said n phase shift units in the relationship output frequency f to phase shift unit 1, output frequency 2f to phase shift unit 2,—output frequency $2^n f$ to phase shift unit n, and
   providing an output light beam from phase shift unit n that is of a higher frequency than said frequency of said input coherent light beam.

2. The method of claim 1 including the steps of;
   providing an entrance polarizer intermediate said input beam and said phase shift unit 1, and
   providing an exit polarizer intermediate said output beam and said phase shift unit n.

3. The method of claim 2 including the step of;
   providing n electrical signal generators whose output frequencies bear the frequency relationship $f$, $2f$,—$2^n f$ and whose duty cycles are about 50%.

4. The method of claim 1 including the step of;
   providing n electrical signal generators whose output frequencies bear the frequency relationship $f$, $2f$,—$2^n f$ and whose duty cycles are about 50%.

5. The method of claim 1 wherein said frequency relationships $f$, $2f$,—$2^n f$ remain constant with time.

6. The method of claim 5 including the step of:
   providing n electrical signal generators whose output frequencies bear the frequency relationship $f$, $2f$,—$2^n f$ and whose duty cycles are about 50%.

7. The method of claim 5 including the steps of;
   providing an entrance polarizer intermediate said input beam and said phase shift unit 1, and
   providing an exit polarizer intermediate said output beam and said phase shift unit n.

8. The method of claim 7 including the step of;
   providing n electrical signal generators whose output frequencies bear the frequency relationship $2f$,—$2^n f$ and whose duty cycles are about 50%.

9. The method of claim 1 wherein said frequencies $f$, $2f$,—$2^n f$ increase with time.

10. The method of claim 9 including the steps of;
    providing an entrance polarizer intermediate said input beam and said phase shift unit 1, and
    providing an exit polarizer intermediate said output beam and said phase shift unit n.

11. The method of claim 10 including the step of;
    providing n electrical signal generators having duty cycles of about 50%.

12. The method of claim 9 including the step of;
    providing n electrical signal generators having duty-cycles of about 50%.

13. Optical frequency shifting apparatus, comprising;
    a cascade arrangement of n frequency responsive phase shift units numbered in cascade sequence from unit 1 through unit n,
    n electrical signal generators whose alternating current output frequencies bear the frequency relationship $f$, $2f$,—$2^n f$,
    means connecting said n electrical signal generators in controlling relation to said phase shift units and in the frequency relationship output frequency f to phase shift unit 1, output frequency 2f to phase shift unit 2,—output frequency $2^n f$ to phase shift unit n,
    input means providing a coherent input light wavefront to said phase shift unit 1, and
    output means receiving an output light wavefront from said phase shift unit n, said output wavefront having a frequency that is shifted relative to the frequency of said input light wavefront, and said output light wavefront having a frequency that is higher than said coherent input light wavefront.

14. The apparatus of claim 13 wherein;
    said input means includes an entrance polarizer, and
    said output means includes an exit polarizer.

15. The apparatus of claim 13 wherein said n electrical signal generators have duty cycles of about 50%.

16. The apparatus of claim 15 wherein;
    said input means includes an entrance polarizer, and
    said output means includes an exit polarizer.

17. The apparatus of claim 13 wherein;
    said n electrical signal generators provide frequency relationships $f$, $2f$,—$2^n f$ that remain constant with time.

18. The apparatus of claim 17 wherein;
    said input means includes an entrance polarizer, and
    said output means includes an exit polarizer.

19. The apparatus of claim 18 wherein said n electrical signal generators provide duty cycles of about 50%.

20. The apparatus of claim 17 wherein said electrical signal generators provide duty cycles of about 50%.

21. The apparatus of claim 13 wherein said frequencies $f$, $2f$,—$2^n f$ increase with time.

22. The apparatus of claim 21 wherein;
    said input means includes an entrance polarizer, and
    said output means includes an exit polarizer.

23. The apparatus of claim 22 wherein;
    said n electrical signal generators have duty cycles of about 50%.

24. The apparatus of claim 21 wherein;
    said electrical signal generators have duty cycles of about 50%.

25. In a condition measuring apparatus wherein a coherent light beam is split into a first and a second portion, said first portion being presented to a variable condition to be measured and the phase of said first portion being shifted a variable amount as a result of said variable condition, said second portion being presented to a frequency shifting apparatus whereat the phase of said second portion is shifted a known amount, said variable phase shifted beam and said known phase shifted beam then being presented to a condition measuring means, the improvement comprising;
    a cascade arrangement of n frequency responsive phase shift units numbered in cascade sequence from unit 1 through unit n,
    n electrical signal generators whose alternating current output frequencies bear the frequency relationship f, 2f,—$2^n$f,
    means connecting said n electrical signal generators in controlling relation to said phase shift units and in the frequency relationship output frequency f to phase shift unit 1, output frequency 2f to phase shift unit 2,—output frequency $2^n$f to phase shift unit n,
    input means for receiving said second beam portion and providing said second beam portion to said phase shift unit 1, and
    output means receiving an output beam from said phase shift unit n and presenting said output beam to said condition measuring means as said known phase shifted beam.

26. The condition measuring apparatus of claim 25 wherein;
    said input means includes an entrance polarizer, and
    said output means includes an exit polarizer.

27. The condition measuring apparatus of claim 25 wherein;
    said n electrical signal generators have duty cycles of about 50%.

28. The condition measuring apparatus of claim 27 wherein;
    said input means includes an entrance polarizer, and
    said output means includes an exit polarizer.

29. The condition measuring apparatus of claim 25 wherein;
    said n electrical signal generators provide frequency relationships f, 2f,—$2^n$f that remain constant with time.

30. The condition measuring apparatus of claim 29 wherein;
    said input means includes an entrance polarizer, and
    said output means includes an exit polarizer.

31. The condition measuring apparatus of claim 30 wherein said n electrical signal generators provide duty cycles of about 50%.

* * * * *